US010082605B2

(12) United States Patent
Ibuki et al.

(10) Patent No.: US 10,082,605 B2
(45) Date of Patent: Sep. 25, 2018

(54) MANUFACTURING METHOD OF ANTIREFLECTION ARTICLE, ANTIREFLECTION ARTICLE, COVER GLASS, AND IMAGE DISPLAY DEVICE

(71) Applicant: FUJIFILM Corporation, Tokyo (JP)

(72) Inventors: Shuntaro Ibuki, Kanagawa (JP); Makoto Uchimura, Kanagawa (JP); Miho Asahi, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 292 days.

(21) Appl. No.: 15/096,781

(22) Filed: Apr. 12, 2016

(65) Prior Publication Data

US 2016/0299260 A1   Oct. 13, 2016

(30) Foreign Application Priority Data

Apr. 13, 2015 (JP) .................. 2015-081782

(51) Int. Cl.
*G02B 1/118* (2015.01)
*C03C 17/00* (2006.01)
(Continued)

(52) U.S. Cl.
CPC ............ *G02B 1/118* (2013.01); *C03C 17/007* (2013.01); *G02B 1/11* (2013.01); *G02B 1/113* (2013.01);
(Continued)

(58) Field of Classification Search
CPC ........... G02B 1/118; G02B 1/113; G02B 1/11; G02B 1/111; H01J 29/896;
(Continued)

(56) References Cited

U.S. PATENT DOCUMENTS

2012/0281292 A1* 11/2012 Baca ................. C03C 17/007
359/601
2013/0194668 A1   8/2013 Liang et al.
(Continued)

FOREIGN PATENT DOCUMENTS

JP   H05-013021 A   1/1993
JP   2002-234754 A   8/2002
(Continued)

OTHER PUBLICATIONS

Notification of Reasons for Refusal issued by the Japanese Patent Office dated Jun. 12, 2018, in connection with Japanese Patent Application No. 2015-081782.

*Primary Examiner* — Ruiyun Zhang
(74) *Attorney, Agent, or Firm* — Edwards Neils LLC; Jean C. Edwards, Esq.

(57) ABSTRACT

There is provided a method of manufacturing a specific antireflection article, the method including: applying, on the substrate, an antireflection layer-forming composition containing: specific binders, specific metal oxide particles, a metal chelate catalyst, and a solvent to dispose a first particle group composed of metal oxide particles which form a convex portion having an unevenness shape, and a second particle group composed of metal oxide particles between the first particle group and the substrate; volatilizing and drying the solvent; and heating and curing the binder (a) and the binder (b) after the volatilizing and drying of the solvent.

14 Claims, 3 Drawing Sheets

(51) Int. Cl.
*G02B 1/113* (2015.01)
*H01J 29/89* (2006.01)
*G02B 1/11* (2015.01)

(52) U.S. Cl.
CPC ..... *H01J 29/896* (2013.01); *H01J 2229/8913* (2013.01); *Y10T 428/10* (2015.01)

(58) Field of Classification Search
CPC .......... H01J 2229/8913; C03C 17/007; C03C 2217/73; C03C 732/44
USPC .......... 428/1.1, 1.5; 427/162; 313/478, 479, 313/480; 359/601; 977/773; 65/60.1, 65/30.14
See application file for complete search history.

(56) References Cited

U.S. PATENT DOCUMENTS

| | | | |
|---|---|---|---|
| 2015/0177425 A1* | 6/2015 | Kondo | G02B 5/0226 428/149 |
| 2015/0276991 A1* | 10/2015 | Uchimura | G02B 1/118 428/148 |
| 2016/0077240 A1 | 3/2016 | Asahi et al. | |
| 2016/0216410 A1 | 7/2016 | Asahi et al. | |

FOREIGN PATENT DOCUMENTS

| | | |
|---|---|---|
| JP | 2009-139796 A | 6/2009 |
| JP | 2014-032248 A | 2/2014 |
| JP | 2014-520056 A | 8/2014 |
| JP | 2014-240956 A | 12/2014 |
| WO | 2015-050017 A1 | 4/2015 |

\* cited by examiner

MANUFACTURING METHOD OF ANTIREFLECTION ARTICLE, ANTIREFLECTION ARTICLE, COVER GLASS, AND IMAGE DISPLAY DEVICE

CROSS REFERENCE TO RELATED APPLICATION(S)

This application claims priority from Japanese Patent Application No. 2015-081782 filed on Apr. 13, 2015, the entire disclosures of which are incorporated herein by reference.

BACKGROUND

1. Field

The present invention relates to a manufacturing method of an antireflection article, an antireflection article, a cover glass, and an image display device.

2. Related Art

In an image display device such as a cathode ray tube display device (CRT), a plasma display panel (PDP), an electroluminescence display (ELD), a vacuum fluorescent display (VFD), a field emission display (FED), and a liquid crystal display (LCD), an antireflection function is generally imparted in order to prevent a reduction in contrast or glare of an image due to the reflection of external light on a display surface of the device. Further, the antireflection function may be imparted in any case other than the image display device.

As a method of imparting the antireflection function, there is a method of using an antireflection article including an antireflection layer provided on a substrate. An antireflection layer has been known, which includes, on the surface of a substrate, an antireflection layer having a fine unevenness shape in which a period is equal to or shorter than the wavelength of the visible light, that is, an antireflection layer having a so-called moth eye structure. By the moth eye structure, a refractive index gradient layer whose a refractive index is continuously varied from the air towards a bulk material inside the substrate is artificially produced, so that reflection of light may be prevented.

As an antireflection layer having the moth eye structure, Japanese Patent Laid-Open Publication No. 2009-139796 (hereinafter JP-A-2009-139796) describes an antireflection layer having an unevenness structure manufactured by applying an application liquid containing a transparent resin monomer and fine particles on a transparent substrate, curing the application liquid to form a transparent resin dispersed with the fine particles, and then, etching the transparent resin.

Further, although there is no mention about the moth eye structure, Japanese Patent Laid-Open Publication No. H5-13021 describes a method of manufacturing an anti-reflector in which an application liquid including tetraethoxysilane and ultrafine particles is applied on a glass substrate and calcined so that the ultrafine particles are fixed by a thin film of $SiO_2$ produced by decomposition of the tetraethoxysilane.

Although there is no mention about the moth-eye structure, Japanese Patent Laid-Open Publication No. 2002-234754 describes a glass article on which a functional thin film is covered by a sol-gel method.

[Patent Document 1] Japanese Patent Laid-Open Publication No. 2009-139796

[Patent Document 2] Japanese Patent Laid-Open Publication No. H5-13021

[Patent Document 3] Japanese Patent Laid-Open Publication No. 2002-234754

However, in the antireflection layer described in JP-A-2009-139796, it has been found that, when high pressure is applied to a moth eye structure formed by particles in the thickness direction, the particles are crushed, thereby causing a problem in that the antireflection function is lost. Further, as the spread of smartphones or tablet PCs, the opportunity to use smartphones or tablet PCs outdoors is increased, so that it is also required to further reduce the reflectance and the haze in order to obtain the visibility under very bright environments.

As described above, an object of the present invention is to provide an antireflection article including an antireflection layer having a moth eye structure on a substrate, in which the hardness is high, the durability against pressure in the thickness direction of the moth eye structure is high, and the reflectance and the haze are low. In addition, another object of the present invention is to provide a manufacturing method by which the antireflection article is conveniently manufactured. Furthermore, still another object of the present invention is to provide the antireflection article, or a cover glass and an image display device, which include the antireflection article manufactured by the manufacturing method.

The present inventors have intensively studied and found that the above-described problem can be solved by using an antireflection article including an antireflection layer on a transparent substrate with a certain compressive stress, in which the antireflection layer contains a certain binder, as well as a first particle group composed of metal oxide particles which form a convex portion having the unevenness shape, and a second particle group composed of metal oxide particles between the first particle group and the substrate.

SUMMARY

That is, the above-described problems may be solved by the following means.

(1) A method of manufacturing an antireflection article including:

a substrate with a compressive stress of 500 MPa or more, consisting of an A a substrate with a compressive stress of 500 MPa or more, consisting of an Al—O bond, or a substrate with a compressive stress of 500 MPa or more, containing both an Al—O bond and a Si—O bond, and an antireflection layer having a moth eye structure in an unevenness shape formed by metal oxide particles on a surface of the antireflection layer, on the substrate, wherein the metal oxide particles include a first particle group and a second particle group, the method including:

applying, on the substrate, an antireflection layer-forming composition containing:

(a) a binder having a weight average molecular weight of 300 to 2,000, which is at least one selected from a monomer represented by Formula (1), a monomer represented by Formula (2), and a product obtained by a condensation reaction of at least one of the monomer represented by Formula (1) and the monomer represented by Formula (2), (b) a binder having a weight average molecular weight of 2,000 or less, which is represented by Formula (3), metal oxide particles, a metal chelate catalyst, and a solvent to dispose the first particle group which forms a convex portion having an unevenness shape and the second particle group between the first particle group and the substrate;

volatilizing and drying the solvent; and heating and curing the binder (a) and the binder (b) after the volatilizing and drying of the solvent, wherein the unevenness shape of the antireflection layer has a ratio B/A of 0.55 or more, which is a ratio of a distance B between a center of apexes of adjacent convex portions and a concave portion to a distance A between the apexes of the adjacent convex portions, an average primary particle diameter of the metal oxide particles is 150 nm to 380 nm, a hydroxyl group content on a surface of the metal oxide particles is $1.00 \times 10^{-1}$ or less, an indentation hardness of the metal oxide particles is 400 MPa or more, and the binder (a) and the binder (b) are blended in the antireflection layer-forming composition at a blending ratio in which an SP value after mixing the binder (a) and the binder (b) is 20 to 24:

$$R^1_{n1}\text{—Si—}X^1_{4-n1} \quad \text{Formula (1)}$$

$$R^2_{n2}\text{—Ti—}X^2_{4-n2} \quad \text{Formula (2)}$$

$$\left( HO \diagdown \underset{X^3}{\overset{R^3}{\underset{|}{\overset{|}{Si}}}} \diagup O \right)_m H \quad \text{Formula (3)}$$

wherein $R^1$, $R^2$ and $R^3$ each independently represent an alkyl group having 1 to 10 carbon atoms or a hydroxyl group, and optionally further includes a substituent, $X^1$, $X^2$ and $X^3$ each independently represent a hydrolysable group or a hydroxyl group, n1 and n2 each independently represent an integer of 0 to 1, m represents an integer of 1 to 22, and a plurality of X's and a plurality of $X^2$'s are optionally same or different, and when a plurality of $X^3$, $R^1$, $R^2$ and $R^3$ is present, a plurality of $X^3$'s, a plurality of R's and a plurality of $R^3$'s are optionally same or different.

(2) The method of (1), wherein the substrate containing both an Al—O bond and a Si—O bond comprises a chemically reinforced layer, a thickness of the substrate is 1.8 mm or less, and a thickness of the chemically reinforced layer is 300 μm or less.

(3) The method of (1), wherein a thickness of the substrate comprising only an Al—O bond is 1.8 mm or less.

(4) The method of (1), wherein the metal oxide particles are calcined silica particles.

(5) The method of (1), wherein a hydroxyl group content on the surface of the metal oxide particles is $1.0 \times 10^{-2}$ or less.

(6) The method of (1), wherein the metal chelate catalyst is a metal complex composed of a metal element selected from Group 2, Group 4, Group 5, and Group 13 of the periodic table, and an oxo- or hydroxyl oxygen-containing compound selected from β-dikentone, ketoester, hydroxycarboxylic acid or esters of the hydroxycarboxylic acid, aminoalcohol, and an enolic active hydrogen compound.

(7) The method of (1), wherein a haze is 1.5% or less at a time point when a residual solvent amount is set to 5% by mass, and the haze is 2% or less at a time point when the residual solvent amount is set to 0.5% by mass.

(8) An antireflection article including:

a substrate with a compressive stress of 500 MPa or more, consisting of an Al—O bond or a substrate with a compressive stress of 500 MPa or more, containing both an Al—O bond and a Si—O bond, and an antireflection layer containing a binder resin, metal oxide particles, and a metal chelate catalyst, the antireflection layer provided on the substrate and having a moth eye structure in an unevenness shape on a surface of the antireflection layer, wherein the metal oxide particles include a first particle group which forms a convex portion having an unevenness shape and a second particle group between the first particle group and the substrate, the unevenness shape of the antireflection layer has a ratio B/A of 0.55 or more, which is a ratio of a distance B between a center of apexes of adjacent convex portions and a concave portion to a distance A between the apexes of the adjacent convex portions, an average primary particle diameter of the metal oxide particles is 150 nm to 380 nm, a hydroxyl group content on the surface of the metal oxide particles is $1.00 \times 10^{-1}$ or less, an indentation hardness of the metal oxide particles is 400 MPa or more, and the binder resin contains:

a cured product of (a) a binder having a weight average molecular weight 300 to 2,000, which is at least one selected from a monomer represented by Formula (1), a monomer represented by Formula (2), and a product obtained by a condensation reaction of at least one of the monomer represented by Formula (1) and the monomer represented by Formula (2), and a cured product of (b) a binder having a weight average molecular weight of 2,000 or less, which is represented by Formula (3), and an SP value after mixing the binder (a) and the binder (b) is 20 to 24:

$$R^1_{n1}\text{—Si—}X^1_{4-n1} \quad \text{Formula (1)}$$

$$R^2_{n2}\text{—Ti—}X^2_{4-n2} \quad \text{Formula (2)}$$

$$\left( HO \diagdown \underset{X^3}{\overset{R^3}{\underset{|}{\overset{|}{Si}}}} \diagup O \right)_m H \quad \text{Formula (3)}$$

wherein $R^1$, $R^2$ and $R^3$ each independently represent an alkyl group having 1 to 10 carbon atoms or a hydroxyl group, and optionally further includes a substituent, $X^1$, $X^2$ and $X^3$ each independently represent a hydrolysable group or a hydroxyl group, n1 and n2 each independently represent an integer of 0 to 1, m represents an integer of 1 to 22, and a plurality of X's and a plurality of $X^2$'s are optionally same or different, and when a plurality of $X^3$, $R^1$, $R^2$ and $R^3$ is present, a plurality of $X^3$'s, a plurality of $R^1$'s and a plurality of $R^3$'s are optionally same or different.

(9) The antireflection article of (8),
wherein the number of particles contained in the first particle group in a direction orthogonal to the surface of the substrate is one,
the number of particles contained in the second particle group in a direction orthogonal to the surface of the substrate is one, and
a mass ratio of the metal oxide particles to the binder resin is 35/65 to 50/50.

(10) The antireflection article of (8),
wherein a binder resin is present between metal oxide particles constituting the second particle group and between the first particle group and the second particle group.

(11) A cover glass including an antireflection article manufactured by the method of manufacturing an antireflection article of (1).

(12) A cover glass including the antireflection article of (8).

(13) An image display device including an antireflection article manufactured by the method of manufacturing an antireflection article of (1).

(14) An image display device including the antireflection article of (8).

According to the present invention, it is possible to provide an antireflection article, in which the hardness is high, the durability against pressure in the thickness direction of the moth eye structure is high, and the reflectance and the haze are low. Further, according to the present invention, it is possible to provide a manufacturing method by which the antireflection article is conveniently manufactured. Furthermore, according to the present invention; it is possible to provide the antireflection article, or a cover glass and an image display device, which include the antireflection article manufactured by the manufacturing method.

DETAILED DESCRIPTION OF EXEMPLARY EMBODIMENTS

[Antireflection Article]
The antireflection article of an aspect of the present invention is an antireflection article including: a substrate with a compressive stress of 500 MPa or more and composed only of an Al—O bond or a substrate including both an Al—O bond and a Si—O bond, and
an antireflection layer containing a binder resin, metal oxide particles, and a metal chelate catalyst provided on the substrate and having a moth eye structure in an unevenness shape on a surface thereof,
in which the antireflection layer has a first particle group composed of metal oxide particles which form a convex portion having the unevenness shape, and a second particle group composed of metal oxide particles between the first particle group and the substrate,
the unevenness shape of the antireflection layer has a ratio B/A of 0.55 or more, which is a ratio of a distance B between a center of apexes of adjacent convex portions and a concave portion to a distance A between the apexes of the adjacent convex portions,
an average primary particle diameter of the metal oxide particles is 150 nm to 380 nm, a hydroxyl group content on the surface of the metal oxide particles is $1.00 \times 10^{-1}$ or less,
an indentation hardness of the metal oxide particles is 400 MPa or more, and
the binder resin contains
a cured product of (a) a binder having a weight average molecular weight 300 to 2,000, which is at least one selected from products obtained by a condensation reaction of a monomer represented by the following Formula (1), a monomer represented by the following Formula (2), and at least one monomer of the two monomers, and
a cured product of (b) a binder having a weight average molecular weight of 2,000 or less, which is represented by the following Formula (3), and
for a blending ratio of the cured product of the binder (a) to the cured product of the binder (b), an SP value after mixing the binder (a) and the binder (b) is 20 to 24.

Formula (1)
$$R^1_{n1}—Si—X^1_{4-n1}$$

Formula (2)
$$R^2_{n2}—Ti—X^2_{4-n2}$$

Formula (3)

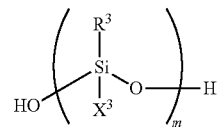

In Formulae (1) to (3), $R^1$, $R^2$ and $R^3$ each independently represent an alkyl group having 1 to 10 carbon atoms or a hydroxyl group, and may further include a substituent. $X^1$, $X^2$ and $X^3$ each independently represent a hydrolysable group or a hydroxyl group. n1 and n2 each independently represent an integer of 0 to 1, and m represents an integer of 1 to 22. A plurality of $X^1$'s and a plurality of $X^2$'s may be same or different. When a plurality of $X^3$, $R^1$, $R^2$ and $R^3$ is present, a plurality of $X^3$'s, a plurality of $R^1$'s and a plurality of $R^3$'s may be same or different.

Hereinafter, the present invention will be described in detail.

Figure 1:
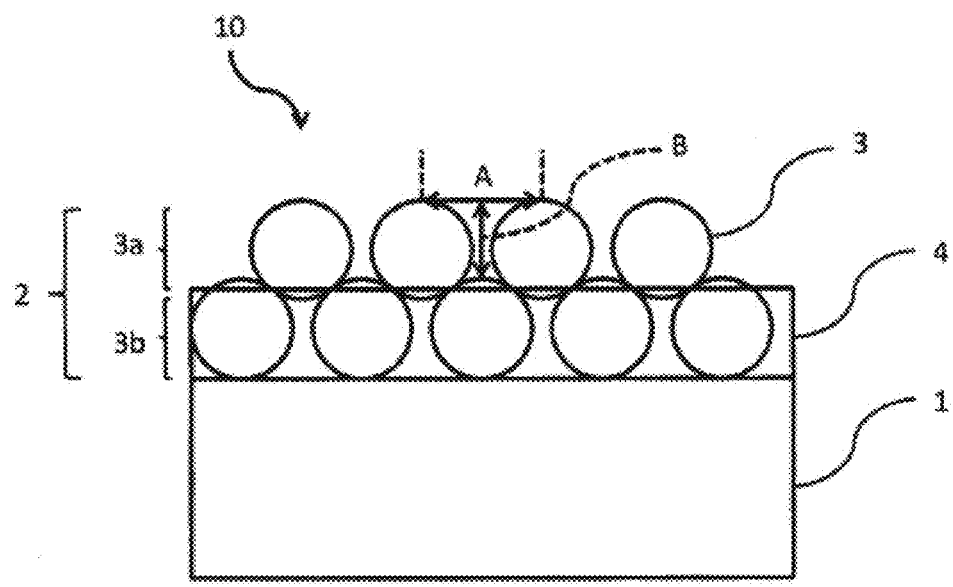
FIG. 1 is a cross-sectional schematic view illustrating an example of the antireflection article of the present invention.

FIG. 1 illustrates an example of preferred exemplary embodiments of the antireflection article of the present invention.

An antireflection article 10 in FIG. 1 includes a and an antireflection layer 2. The antireflection layer 2 includes a first particle group 3a composed of metal oxide particles 3, a second particle group 3b composed of metal oxide particles 3, and a binder resin 4.

The antireflection layer 2 has a moth eye structure in an unevenness shape on a surface at a side opposite to an interface with the substrate 1, and a convex portion is formed by the first particle group 3a composed of metal oxide particles. The second particle group 3b composed of metal oxide particles is present between the first particle group 3a and the substrate 1. It is preferred that a concave portion having an unevenness shape is the binder resin 4 or the second particle group 3b.

The unevenness shape of the antireflection layer 2 has a ratio B/A of 0.55 or more, which is a ratio of a distance B between a center of apexes of adjacent convex portions and a concave portion to a distance A between the apexes of the adjacent convex portions.

From the viewpoint of hardness and reflectance, it is preferred that the binder resin 4 is present between metal oxide particles at least constituting the second particle group 3b and between the first particle group 3a and the second particle group 3b.

[Antireflection Layer]
(Moth Eye Structure)

In the antireflection article, the surface of the antireflection layer opposite to the substrate has a moth eye structure in an unevenness shape formed by the metal oxide particles.

Here, the moth eye structure is a surface processed with a substance (material) for suppressing reflection of light, and refers to a structure having a periodic fine structured pattern. Particularly, for the purpose of suppressing reflection of visible light, the moth eye structure refers to a structure having a fine structured pattern with a period of less than 780 nm. When the period of the fine structured pattern is less than 380 nm, the period is preferred in that the hue of the reflected light disappears. Furthermore, when the period is 150 nm or more, the period is preferred because light with a wavelength of 380 nm may recognize the fine structured pattern, and the antireflection property is excellent. The presence and absence of the moth eye structure may be confirmed by observing the surface shape by a scanning electron microscope (SEM), an atomic force microscope (AFM), or the like, and examining whether the fine structured pattern is formed.

The unevenness shape of the antireflection layer of the antireflection article has a ratio B/A of 0.55 or more, which is a ratio of a distance B between a center of apexes of adjacent convex portions and a concave portion to a distance A between the apexes of the adjacent convex portions. When B/A is 0.55 or more, the depth of the concave portion is increased with respect to the distance between the adjacent convex portions, so that a reflective index gradient layer whose refractive index is varied more moderately from the air to the inside of the antireflection layer is produced. Therefore, the reflectance may be more reduced.

A method of measuring the ratio B/A, which is a ratio of the distance A between the apexes of the adjacent convex portions and the distance B between the center of the apexes of the adjacent convex portions and the concave portion, will be described below in more detail.

The B/A may be measured by cross-sectional SEM observation of the antireflection layer. After an antireflective article sample is gashed by a diamond cutter, and the like, SEM observation is performed at an appropriate magnification (about 5,000 times) by cutting through the gash to expose the cross-section of the sample. For ease of observation, an appropriate processing such as carbon deposition or etching may be performed on the sample. Assuming that a distance between apexes of adjacent convex portions is defined as A at an interface formed by the air and the sample, and a distance between a straight line connecting the adjacent convex portions and a concave portion which is a point where the perpendicular bisector thereof reaches a particle or the binder resin is defined as B in a plane which includes the apexes of the adjacent convex portions and is perpendicular to the substrate surface, the ratio B/A is calculated as an average value of B/A when measuring the length at 100 points.

Figure 3:
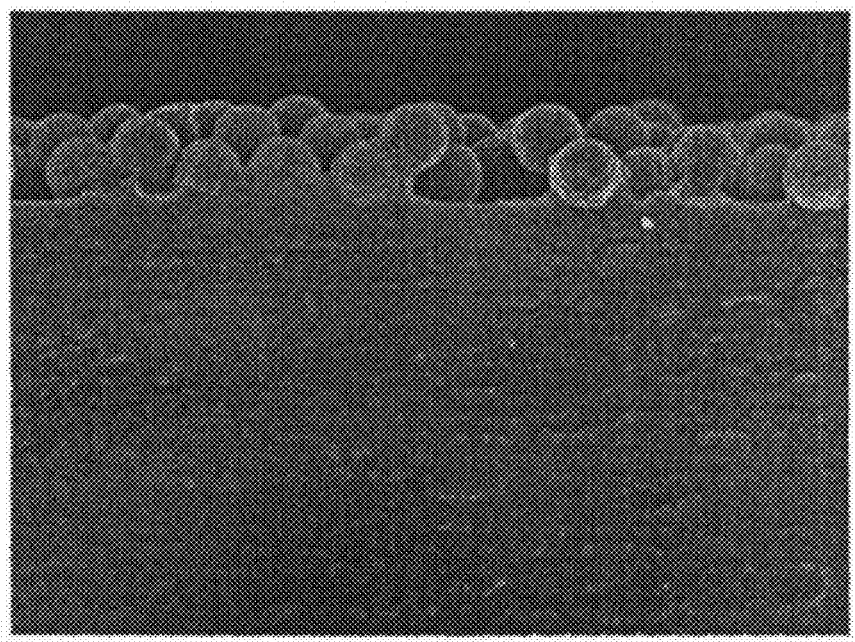
FIG. 3 is a view illustrating a scanning electron microscope photograph of an example of the antireflection article of the present invention.

In the SEM photograph, the distance A between the apexes of the adjacent convex portions and the distance B between the center of the apexes of the adjacent convex portions and the concave portion may not be precisely measured with respect to all the photographed unevenness, and in such a case, the length may be measured by paying attention to the convex portions and the concave portion photographed in front in the SEM image (see FIG. 3).

Meanwhile, as for the concave portion, it is necessary to measure the length at the same depth as the particles forming two adjacent convex portions to be measured in the SEM image. This is because when the length is measured by regarding a distance up to particles photographed at a more front side as B, B would be estimated small in some cases.

The ratio B/A is preferably 0.5 or more, more preferably 0.6 or more, and even more preferably 0.65 or more. In addition, the ratio B/A is preferably 0.9 or less from the viewpoint that the moth eye structure may be firmly fixed and the scratch resistance is excellent.

It is preferred to compactly lay the metal oxide particles at a uniform and high filling ratio in order to reduce the reflectivity. Further, it is also important that the filling ratio is not too high, and this is because when the filling ratio is too high, the adjacent particles come in contact with each other, so that the ratio B/A of the unevenness is reduced, thereby resulting in higher reflectance.

From the above-described viewpoint, it is preferred that the content of the metal oxide particles is adjusted to be uniform throughout the antireflection layer. The filling ratio of the first particle group may be measured as an area occupancy ratio of particles located closest to the surface side when observing the metal oxide particles from the surface, by SEM and the like. The filling ratio is preferably 50% to 85%, more preferably 60% to 80%, and even more preferably 65% to 75%.

In addition, the filling ratio of the second particle group and the filling ratio of the first particle group may be same or different. The filling ratio of the second particle group is preferably 60% to 95%, more preferably 70% to 90%, and most preferably 75% to 85%.

(Metal Oxide Particles)

The metal oxide particles forming the moth eye structure of the antireflection layer will be described.

In the present invention, there is a configuration in which particles are stacked in at least two tiers in the thickness direction of a substrate because a first particle group composed of metal oxide particles is present on the surface opposite to the substrate and a second particle group composed of metal oxide particles is present between the first particle group and the substrate.

The antireflection layer may further have a third particle group or particle groups or more between the second particle group and the substrate, that is, may have a configuration in which particles are stacked in three or more tiers in the thickness direction of the substrate.

With respect to the first particle group, the same particle may be used in the second, furthermore, the third particle group, and other particles having different types of particles, diameters of particles, and surface modification may be combined.

As described below, metal oxide particles may be arranged in two or more tiers in the thickness direction of the substrate by appropriately controlling a material for a binder resin and the blending ratio thereof to use a antireflection layer-forming composition, which has good dispersibility, and adjusting the amount of metal oxide particles added.

The average primary particle diameter of the metal oxide particles is 150 nm to 380 nm, preferably 150 nm to 320 nm, and more preferably 150 nm to 250 nm. When the average primary particle diameter is 150 nm or more, it is preferred that aggregation of the particles is suppressed, and when the average primary particle diameter is 380 nm or less, it is preferred in that haze is suppressed.

The average primary particle diameter of the metal oxide particles refers to a 50% cumulative particle diameter of a volume average particle diameter. When the average primary particle diameter of the metal oxide particles included in the antireflection layer is measured, the particle diameter may be measured by electron microscope photographs. For example, a 50% accumulative particle diameter may be obtained as the average primary particle diameter by capturing a sectioned TEM (Transmission Electron Microscopy) image of the antireflection article and measuring each of diameters of 100 primary particles to calculate the volume. When a particle does not have a spherical diameter, an average value of the major axis and the minor axis thereof is considered as a diameter of the primary particle.

In the present invention, the amount of hydroxyl groups on the surface of a particle is defined as follows. The amount of hydroxyl groups is measured by a solid-state $^{29}$Si NMR ($^{29}$Si CP/MAS). When a signal intensity of a metal element M on a surface of a metal oxide fine particle, which is bound to n hydroxyl groups, is assumed as Qn, the amount of hydroxyl groups on the particle surface is a sum of the existent Qn×n÷ (the square of a particle radius (unit:nm)). For example, when the particles are silica (particle radius R), silicon bound to four neutral oxygen atoms (signal intensity Q0), silicon bound to three neutral oxygen atoms and one hydroxyl group (signal intensity Q1), and silicon bound to two neutral oxygen atoms and two hydroxyl groups (signal intensity Q2) are present, and the amount of hydroxyl groups on the particle surface is (Q1×1+Q2×2)÷R2. In the case of silica, a signal which imparts the signal intensity Q2, a signal which imparts the signal intensity Q1, and a signal which imparts the signal intensity Q0 have a chemical shift of −91 ppm to −94 ppm, −100 ppm to −102 ppm, and −109 ppm to −111 ppm, respectively.

As the particle surface is hardened by firing, the amount of hydroxyl groups on the particle surface is decreased and $1.00 \times 10^{-1}$ or less, preferably $1.00 \times 10^{-5}$ to $1.00 \times 10^{-1}$, more preferably $1.00 \times 10^{-4}$ to $5.00 \times 10^{-2}$, and even more preferably $5.00 \times 10^{-4}$ to $1.00 \times 10^{-3}$ in the present invention.

The indentation hardness of the metal oxide particles is 400 MPa or more, preferably 500 MPa or more, and more preferably 600 MPa or more. When the indentation hardness of the metal oxide particles is 400 MPa or more, the indentation hardness is preferred, because the durability against pressure in the thickness direction of the moth eye structure is enhanced. Further, since the metal oxide particles tend to be brittle and fragile when the indentation hardness is too high, the hardness of the metal oxide particles is preferably 1,000 MPa or less.

The indentation hardness of the metal oxide particles may be measured by a nanoindenter, and the like. The indentation hardness may be measured by preparing, as a sample, metal oxide particles which are fixed so as not to move when measured with a resin and the like in a state where the particle surface is exposed by arranging the particles on a substrate (a glass plate, a quartz plate, or the like), which is harder than themselves, so as not to overlap in more than one tier, and pressing the sample with a diamond indenter. It would be better to specify the indentation position by a tribo indenter.

Examples of the metal oxide particles include silica particles, titania particles, zirconia particles, alumina particles, antimony pentoxide particles, and the like, but the metal oxide particles are preferably silica particles or silica coated zirconia particles from the viewpoint that it is difficult to generate haze is and the moth eye structure is easily formed due to the refractive index close to that of the binder resin to be described below.

The metal oxide particles are particularly preferably calcined silica particles for a reason that the particles have an appropriate amount of hydroxyl groups on the surface thereof, and high indentation hardness.

The calcined silica particles may be prepared by a publicly-known technology in which a hydrolysable silicon compound are subjected to hydrolysis and condensation in an organic solvent including water and a catalyst to obtain silica particles, and then the silica particles are calcined, and reference may be made to, for example, Japanese Patent Laid-Open Publication Nos. 2003-176121, 2008-137854, 2012-136363, and the like.

The silicon compound of a raw material for preparing the calcined silica particles is not particularly limited, but examples thereof include a chlorosilane compound such as tetrachlorosilane, methyltrichlorosilane, phenyltrichlorosilane, dimethyldichlorosilane, diphenyldichlorosilane, methylvinyldichlorosilane, trimethylchlorosilane, and methyldiphenylchlorosilane; an alkoxysilane compound such as tetramethoxysilane, tetraethoxysilane, tetraisopropoxysilane, tetrabutoxysilane, methyltrimethoxysilane, methyltriethoxysilane, trimethoxyvinylsilane, triethoxyvinylsilane, 3-glycidoxypropyltrimethoxysilane, 3-chloropropyltrimethoxysilane, 3-mercaptopropyltrimethoxysilane, 3-(2-aminoethylamino)propyltrimethoxysilane, phenyltrimethoxysilane, phenyltriethoxysilane, dimethyldimethoxysilane, dimethyldiethoxysilane, 3-glycidoxypropylmethyldimethoxysilane, 3-glycidoxypropylmethyldiethoxysilane, 3-chloropropylmethyldimethoxysilane, diphenyldimethoxysilane, diphenyldiethoxysilane, dimethoxydiethoxysilane, trimethylmethoxysilane, and trimethylethoxysilane; an acyloxysilane compound such as tetraacetoxysilane, methyltriacetoxysilane, phenyltriacetoxysilane, dimethyldiacetoxysilane, diphenyldiacetoxysilane, and trimethylacetoxysilane; a silanol compound such as dimethylsilanediol, diphenylsilanediol, and trimethylsilanol; and the like. Among the silane compounds as exemplified above, the alkoxysilane compound is particularly preferred because the compound is more easily available and no halogen atom is included as an impurity in the resulting calcined silica particles. As a preferred form of the calcined silica particles according to the present invention, it is preferred that the content of halogen atoms is substantially 0%, and no halogen atom is detected.

The firing temperature is not particularly limited, but is preferably 800° C. to 1,300° C., and more preferably 1,000° C. to 1,200° C.

The shape of the metal oxide particles are most preferably spherical, but it is also possible to use those other than a spherical shape such as amorphous.

The metal oxide particles may be prepared by firing commercially available particles. As a specific example thereof, it is possible to preferably use SNOWTEX MP-2040 (average primary particle diameter 200 nm, silica manufactured by Nissan Chemical Industries. LTD.), SEAHOSTAR KE-P10 (average primary particle diameter 150 nm, amorphous silica manufactured by NIPPON SHOKUBAI Co., Ltd.), SEAHOSTAR KE-P20 (average primary particle diameter 200 nm, amorphous silica manufactured by NIPPON SHOKUBAI Co., Ltd.), ASFP-20 (average primary particle diameter 200 nm, alumina manufactured by Nippon Denki Kagaku Kogyo K.K.), and the like. Further, as long as the requirements of the present invention are satisfied, commercially available particles may be used as they are. As the specific example, SEAHOSTAR KE-S30 (average primary particle diameter 300 nm, amorphous silica manufactured by NIPPON SHOKUBAI CO., LTD.), and the like are preferred.

In the content ratio of the metal oxide particles and the binder resin, based on the first particle group forming the unevenness, the preferred range thereof varies depending on the thickness of the second particle group which becomes the lower layer thereof, but for example, in the case of a two-tier particle configuration in which the first particle group is arranged in one row and the second particle group is arranged in one row, that is, in the case where the number of particles in a direction orthogonal to the surface of the substrate included in the first particle group is one, and the number of particles in a direction orthogonal to the surface of the substrate included in the second particle group is one (sum of the number of particles in a direction orthogonal to the surface of the substrate is 2), the content ratio (mass of the metal oxide particles/mass of the binder resin) is preferably 35/65 to 50/50, more preferably 37/63 to 48/52, and even more preferably 39/61 to 46/54.

The state where the number of particles in a direction orthogonal to the surface of the substrate is 1 may be 1 on average.

Based on the total solid content concentration in an antireflection layer-forming composition, the content of the metal oxide particles is preferably 10% by mass to 50% by mass, more preferably 15% by mass to 45% by mass, and even more preferably 20% by mass to 40% by mass. When the content of the particles is 10% by mass or more, the ratio of a material other than the binder resin including a crosslinking group is not increased, and the binding force between the particles and the binder resin becomes strong, so that it is difficult to cause dropping of particles. Further, when the content of the particles is 50% by mass or less, it is preferred that the surface area of the particles is not excessively increased, and likewise, the binding force between the particles and the binder resin becomes strong.

(Binder Resin)

The binder resin of the antireflection layer will be described.

The binder resin contains a cured product of (a) a binder having a weight average molecular weight 300 to 2,000, which is at least one selected from products obtained by a condensation reaction of a monomer represented by the following Formula (1), a monomer represented by the following Formula (2), and at least one monomer of the two monomers, and a cured product of (b) a binder having a weight average molecular weight of 2,000 or less, which is represented by the following Formula (3), and in which for a blending ratio of the cured product of the binder (a) to the cured product of the binder (b), an SP value after mixing the binder (a) and the binder (b) is 20 to 24.

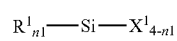  Formula (1)

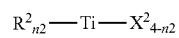  Formula (2)

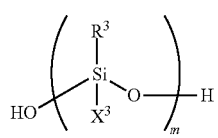  Formula (3)

In Formulae (1) to (3), $R^1$, $R^2$ and $R^3$ each independently represent an alkyl group having 1 to 10 carbon atoms or a hydroxyl group, and may further include a substituent. $X^1$, $X^2$ and $X^3$ each independently represent a hydrolysable group or a hydroxyl group. n1 and n2 each independently represent an integer of 0 to 1, and m represents an integer of 1 to 22. A plurality of $X^1$'s and a plurality of $X^2$'s may be same or different. When a plurality of $X^3$, $R^1$, $R^2$ and $R^3$ is present, a plurality of $X^3$'s, a plurality of $R^3$'s and a plurality of $R^3$'s may be same or different.

Examples of the hydrolysable group represented by $X^1$, $X^2$, and $X^3$ include an alkoxy group, a halogen atom, an amino group, and the like, and the alkoxy group is preferred.

$R^1$, $R^2$, and $R^3$ represent an alkyl group having 1 to 10 carbon atoms, an alkyl group having 1 to 5 carbon atoms is preferred, and an alkyl group having 1 to 3 carbon atoms is more preferred from the viewpoint of reactivity. A plurality of $R^1$'s, $R2$'s and $R^3$'s may be same or different, respectively. These groups may also have a substituent, and may have an atom (for example, a halogen atom, S, N, O, Si, and the like) other than carbon atoms in the substituent. Examples of the substituent include a halogen atom, and a functional group such as a mercapto group, an amino group, a (meth)acryloyl group, and oxirane ring-containing group.

n1 and n2 are preferably 0.

Specific examples of Formula (1) and specific examples of Formula (3) include tetraethoxysilane, tetrapropoxysilane, tetrabutoxysilane, methyltrimethoxysilane, methyltriethoxysilane, phenyltriethoxysilane, n-propyltrimethoxysilane, n-propyltriethoxysilane, hexyltrimethoxysilane, hexyltriethoxysilane, methyltrichlorosilane, phenyltrichlorosilane, vinyltrimethoxysilane, vinyltriethoxysilane, 3-glycidoxypropyltrimethoxysilane, 3-glycidoxyoctyltrimethoxysilane, 3-methacryloxypropyltrimethoxysilane, 3-methacryloxyoctyltrimethoxysilane, 3-methacryloxypropyltriethoxysilane, acryloxypropyltrimethoxysilane, 3-aminopropyltrimethoxysilane, 3-aminopropyltriethoxysilane, 3-mercaptopropyltrimethoxysilane, and the like.

Further, specific examples of Formula (2) include tetraisopropyl titanate, tetra-normal butyl titanate, butyl titanate dimer, tetra octyl titanate, tertiary amyl titanate, tetra tertiary butyl titanate, tetrastearyl titanate, and the like. As a commercially available product, ORGATICS TA-10, TA-21, TA-23, TA-30, TA-12, TA-60, TA-80, TA-90 (all manufactured by Matsumoto Fine Chemical Co., Ltd.), and the like may be preferably used.

The compound including Ti, which is represented by Formula (2), exhibits a so-called photocatalytic reaction (oxidation reaction) caused by photoexcitation and an ultrahydrophilic reaction. The photocatalytic reaction is derived from an oxidation-reduction reaction on the surface of a compound of an electron • hole pair produced by photoexcitation of the Ti compound. Meanwhile, an ultrahydrophilic phenomenon in which the water contact angle decreases to nearly 0 degree is exhibited by photoexcitation. It is thought that this is derived from the separation of electric charges caused by phtoexcitation, followed by a surface structure change. When the binder resin contains an anatase-type titanium oxide compound obtained by a condensation reaction of the monomer represented by Formula (2), an excellent antifouling property may be obtained, and it is thought that the binder resin becomes particularly suitable for the outdoor use in which ultraviolet light is irradiated.

The binder resin contains at least two compounds (a cured product of the binder (a) and a cured product of the binder (b)). Specifically, $X^1$ and $X^2$ of Formulae (1) and (2) in the binder (a) remain as a form of OR (R is an alkyl group) or a hydrolysable group, and the binder (b) has a terminal OH.

In the present invention, an SP value after mixing the binder (a) and the binder (b) becomes 20 to 24. In this manner, the dispersibility of metal oxide particles having an average primary particle diameter of 150 nm to 380 nm may be much improved by limiting the SP value which indicates the hydrophilicity of a resin as described above, so that it is thought that particularly, it is possible to obtain an antireflection article which has a great effect on the dispersibility after the solvent is volatilized, low reflectance, and low haze. The SP value after mixing may be adjusted to 20 to 24 by appropriately selecting the blending ratio of the binder (a) and the binder (b). Although the SP value is changed by particles and surface modification of the metal oxide particles, the SP value after mixing when, for example, calcined silica particles are used as the metal oxide particles is more preferably 21 to 23, and even more preferably 21.5 to 22.5.

Meanwhile, the SP value after mixing the binder (a) and the binder (b) is a value obtained by adding up the SP value of the binder (a) and the SP value of the binder (b) as each content ratio.

The SP value (solubility parameter) in the present invention is a valued calculated by the Fedors method, and the Fedors method is shown in Table 7.3 of PROPERTIES OF POLYMERS.

The binder (a) has a weight average molecular weight of 300 to 2,000, preferably 320 to 1,900, and more preferably 340 to 1,800. In the step of heating and curing the binder resin to be descried below, the binder (a) may be prevented from being volatilized by adjusting the weight average molecular weight to 300 or more. Further, when the weight average molecular weight of the binder (a) is 2,000 or less, it is possible to prevent reduction in the shrinkage rate of the entire resin or aggregation of metal oxide particles.

The weight average molecular weight and the number average molecular weight in the present invention are values measured under the following conditions by gel permeation chromatography (GPC).

[Solvent] Tetrahydrofuran
[Device Name] TOSOH HLC-8220 GPC
[Column] use three TOSOH TSKgel Super HZM-H's (4.6 mm×15 cm) in connection with each other.
[Column Temperature] 25° C.
[Sample Concentration] 0.1% by mass
[Flow Rate] 0.35 ml/min
[Calibration Curve] use a calibration curve by 7 samples of the TSK standard polystyrene with Mw=2,800,000 to 1,050 manufactured by TOSOH Corporation.

The binder (b) has a weight average molecular weight of 2,000 or less, preferably 1,900 or less, and more preferably 18,000 or less. When the weight average molecular weight of the binder (b) is 2,000 or less, it is possible to prevent reduction in the shrinkage rate of the binder resin or aggregation of metal oxide particles.

Specific examples of the binder (a) include Ethyl Silicate 40 (manufactured by COLCOAT CO., Ltd.), Ethyl Silicate 48 (manufactured by COLCOAT CO., Ltd.), Methyl Silicate 51 (manufactured by COLCOAT CO., Ltd.), and Methyl Silicate 53A (manufactured by COLCOAT CO., Ltd.).

In addition, examples of the binder (b) include those obtained by subjecting Ethyl Silicate 40 (manufactured by COLCOAT CO., Ltd.), Ethyl Silicate 48 (manufactured by COLCOAT CO., Ltd.), and the like to acid treatment in advance.

(Metal Chelate Catalyst)

The antireflection layer contains a metal chelate catalyst.

The metal chelate catalyst is preferably added to a antireflection layer-forming composition, which contains the binder (a), the binder (b), and the metal oxide particles and thus, preferably acts as a catalyst for the condensation reaction of the binder (a) and the binder (b). Further, the metal chelate catalyst also has a function of enhancing the binding force of the metal oxide particles and the binder resin.

The metal chelate catalyst is preferably a metal complex composed of a metal element selected from Group 2, Group 4, Group 5, and Group 13 of the periodic table, and an oxo or hydroxyl oxygen-containing compound selected from β-dikentone, ketoester, hydroxycarboxylic acid or esters thereof, aminoalcohol, and an enolic active hydrogen compound.

Among the constituent metal elements, Group 2 elements such as Mg, Ca, Sr, and Ba, Group 4 elements such as Ti and Zr, Group 5 elements such as V, Nb, and Ta, and Group 13 elements such as Al and Ga are preferred, each of which forms a complex having an excellent catalytic effect. Among them, a metal complex obtained from Zr, Al, and Ti is preferred.

Examples of the oxo or hydroxyl oxygen-containing compound constituting a ligand of the metal complex include β-dikentones such as acetylacetone (2,4-pentanedione) and 2,4-heptanedione, ketoesters such as methyl acetoacetate, ethyl acetoacetate, and butyl acetoacetate, hydroxycarboxylic acids such as lactic acid, methyl lactate, salicylic acid, ethyl salicylate, phenyl salicylate, malic acid, tartaric acid, and methyl tartrate, and esters thereof, ketoalcohols such as 4-hydroxy-4-methyl-2-pentanone, 4-hydroxy-2-pentanone, 4-hydroxy-4-methyl-2-heptanone, and 4-hydroxy-2-heptanone, aminoalcohols such as monoethanolamine, N,N-dimethylethanolamine, N-methylmonoethanolamine, diethanolamine, and triethanolamine, an enolic active compound such as methylolmelamine, methylolurea, mcthylolacrylamide, and diethyl malonate ester, and a compound having a substituent on a methyl group, a methylene group or a carbonyl carbon of acetylacetone (2,4-pentandione).

A preferred ligand is an acetylacetone derivative, which refers to a compound having a substituent on a methyl group, a methylene group or a carbonyl carbon of acetylacetone. The substituent substituted with the methyl group of acetylacetone is a straight or branched alkyl group, an acyl group, a hydroxyalkyl group, a carboxyalkyl group, an alkoxy group, and an alkoxyalkyl group, all having 1 to 3 carbon atoms, the substituent substituted with the methylene group of acetylacetone is a carboxy group, a straight or branched carboxyalkyl group and a hydroxyalkyl group, all having 1 to 3 carbon atoms, and the substituent substituted with the carbonyl carbon of acetylacetone is an alkyl group having 1 to 3 carbon atoms, and in this case, a hydrogen atom is added to the carbonyl oxygen which then turns to a hydroxyl group.

Specific examples of a preferred acetylacetone derivative include ethylcarbonylacetone, n-propylcarbonylacetone, i-propylcarbonyl acetone, diacetylacetone, 1-acetyl-1-propionyl-acetylacetone, hydroxyethylcarbonylacetone, hydroxypropylcarbonylacetone, acetoacetic acid, acetopropionic acid, diacetoacetic acid, 3,3-diacetopropionic acid, 4,4-diacetobutyric acid, carboxyethylcarbonylacetone, carboxypropylcarbonylacetone, and diacetone alcohol. Among them, acetylacetone and diacetylacetone are particularly preferred. A complex of the aforementioned acetylacetone derivative and the metal element is a mononuclear complex with 1 to 4 acetylacetone derivative coordinated per metal element, and in a case where the number of the coordinatable hands of the metal element is larger than the sum of the number of coordinatable bonding hands of the acetylacetone derivative, a ligand generally used in an ordinary complex, such as a water molecule, a halogen ion, a nitro group, and an ammonio group, may also be coordinated thereto.

Examples of a preferred metal complex include tris(acetylacetonato)aluminum complex salt, di(acetylacetonato)aluminum • aquocomplex salt, mono(acetylacetonato)aluminum • chlorocomplex salt, di(diacetylacetonato)aluminum complex salt, ethylacetoacetate aluminum diisopropylate, aluminum tris(ethylacetoacetate), cyclic aluminum oxide isopropylate, tris(acetylacetonato)barium complex salt, di(acetylacetonato)titanium complex salt, tris(acetylacetonato)titanium complex salt, di-i-propoxy • bis(acetylacetonato)titanium complex salt, zirconium tris(ethylacetoacetate), zirconium tris(benzoate) complex salt, and the like. These metal complexes are excellent in stability in an aqueous coating liquid and an effect for facilitating gelation in a sol-gel reaction upon heating and drying, but, among them, ethylacetoacetate aluminum diisopropylate, aluminum tris(ethylacetoacetate), di(acetylacetonato)titanium complex salt, and zirconium tris(ethylacetoacetate) are preferred.

The descriptions of a counter salt of the aforementioned metal complex are omitted in the present specification, but the kind of counter salt is arbitrary as long as the counter salt is a water-soluble salt which maintains the charge neutrality as the complex compound, and a salt form, in which stoichiometric neutrality is secured, such as, for example, nitrate, halogenate, sulfate, and phosphates, is used.

A behavior of the metal complex in a silica sol-gel reaction is described in detail in J. Sol-Gel. Sci. and Tec. 16. 209 (1999).

The aforementioned metal complex catalyst is readily available as a commercially available product, and may also be obtained by a publicly-known synthesis method, for example, a reaction of each metal chloride and alcohol.

The content of the metal chelate catalyst in the antireflection layer is preferably 0.1% by mass to 10% by mass, more preferably 0.5% by mass to 5% by mass, and even more preferably 1% by mass to 3% by mass based on the binder resin. When the content is 0.1% by mass or more, the hardness of the film is sufficient, and when the content is 10% by mass, condensation of the binder resin does not proceed excessively. Therefore, the binding of the metal oxide particles with the binder resin is sufficient, so that it becomes difficult for the particles to be dropped.

(Substrate)

The substrate in the antireflection article of the present invention is a substrate with the surface having a compressive stress of 500 MPa or more and composed of an Al—O bond, or a substrate including both an Al—O bond and a Si—O bond.

The compressive stress of the surface of the substrate is more preferably 550 MPa or more, and even more preferably 600 MPa or more. Further, the compressive stress of the surface of the substrate is more preferably 4,000 MPa or more, and even more preferably 3,500 MPa or more.

For the substrate, the total light transmittance in a visible light region (particularly wavelength of 380 nm to 780 nm) is preferably 80% or more, more preferably 85% or more, and even more preferably 90% or more. The total light transmittance is measured in accordance with JIS-K7361. In the measuring device, a haze meter NDH4000 manufactured by Nippon Denshoku Industries Co., Ltd. is used.

The thickness of the substrate is preferably 1.8 mm or less, more preferably 0.1 mm to 1.5 mm, and even more preferably 0.3 mm to 1.2 mm.

In addition, the substrate including both an Al—O bond and a Si—O bond has a chemically reinforced layer, and the thickness of the chemically reinforced layer is preferably 300 μm or less, more preferably 250 pin or less, and even more preferably 200 μm or less.

As the substrate, an alumino silicate (alumino silicic acid) glass or a sapphire substrate, and the like may be used. Examples thereof include a chemically reinforced glass manufactured by Matsunami Glass Ind., Ltd., "Gorilla Glass" (trade name), "Gorilla Glass 2" (trade name), and "Gorilla Glass 3" (trade name) manufactured by Corning, Inc., "Dragontrail" (trade name) manufactured by Asahi Glass Co., Ltd., "CX-01", "CX-01P", and "CX-01T" manufactured by Nippon Electric Glass Co., Ltd., (ARMOREX) manufactured by Central Glass Co., Ltd., a chemically reinforced glass manufactured by Nippon Sheet Glass Company, Ltd., and "Xensation Cover" and "Xensation Cover 3D" manufactured by SCHOTT Japan Corporation, and examples of the substrate composed only of an Al—O bond include a sapphire glass ($Al_2O_3$ single crystal substrate), and the like, so that these substrates may be preferably used.

(Other Functional Layers)

The antireflection article of the present invention includes an antireflection layer, and may further include a functional layer other than the antireflection layer.

Preferred examples thereof include an aspect in which the antireflection article includes a hardcoat layer between a substrate and an antireflection layer. Furthermore, the antireflection article may include an easily adhesive layer for imparting adhesion, a layer for imparting antistatic properties, and the like, and may include a plurality of these layers.

[Method of Manufacturing Antireflection Article]

The method of manufacturing an antireflection article according to the present invention is not particularly limited, but a manufacturing method using an application method is preferred from the viewpoint of production efficiency.

The method of manufacturing an antireflection article is preferably a method of manufacturing an antireflection article including:

a substrate with a compressive stress of 500 MPa or more and composed only of an Al—O bond or a substrate including both an Al—O bond and a Si—O bond, and having a moth eye structure in an unevenness shape formed by metal oxide particles on a surface thereof on the substrate, the method including: the steps of applying a antireflection layer-forming composition, which contains (a) a binder having a weight average molecular weight 300 to 2,000, which is at least one selected from products obtained by a condensation reaction of a monomer represented by the following Formula (1), a monomer represented by the following Formula (2), and at least one monomer of the two monomers, (b) a binder having a weight average molecular weight of 2,000 or less, which is represented by the following Formula (3), metal oxide particles, a metal chelate catalyst, and a solvent on the substrate on the substrate, and disposing a first particle group composed of metal oxide particles which form a convex portion having the unevenness shape, and a second particle group composed of metal oxide particles between the first particle group and the substrate,
volatilizing and drying the solvent, and
heating and curing the binder (a) and the binder (b) after the volatilizing and drying of the solvent,
in which the unevenness shape of the antireflection layer has a ratio B/A of 0.55 or more, which is a ratio of a distance B between a center of apexes of adjacent convex portions and a concave portion to a distance A between the apexes of the adjacent convex portions,
an average primary particle diameter of the metal oxide particles is 150 nm to 380 nm,
a hydroxyl group content on the surface of the metal oxide particles is $1.00 \times 10^{-1}$ or less,
an indentation hardness of the metal oxide particles is 400 MPa or more, and
the binder (a) and the binder (b) are blended in the antireflection layer-forming composition at a blending ratio in which an SP value after mixing the binder (a) and the binder (b) is 20 to 24.

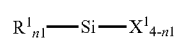
Formula (1)

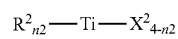
Formula (2)

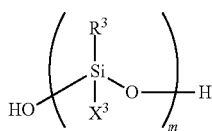
Formula (3)

In Formulae (1) to (3), $R^1$, $R^2$ and $R^3$ each independently represent an alkyl group having 1 to 10 carbon atoms or a hydroxyl group, and may further include a substituent. $X^1$, $X^2$ and $X^3$ each independently represent a hydrolysable group or a hydroxyl group. n1 and n2 each independently represent an integer of 0 to 1, and m represents an integer of 1 to 22. A plurality of $X^1$'s and a plurality of $X^2$'s may be same or different. When a plurality of $X^3$, $R^1$, $R^2$ and $R^3$ is present, a plurality of $X^3$'s, a plurality of $R^1$'s and a plurality of $R^3$'s may be same or different.

The binder (a), the binder (b), the metal chelate catalyst and the metal oxide particles included in the antireflection layer-forming composition are the same as those described above.

As the solvent included in the antireflection layer-forming composition, it is preferred that a solvent having a polarity close to those of the metal oxide particles is selected from the viewpoint of improving the dispersibility. Specifically, an alcohol-based solvent is preferred, and examples thereof include methanol, ethanol, 2-propanol, I-propanol, butanol, and the like. Further, when the particle are, for example, hydrophobically surface-modified metal resin particles, ketone-based, ester-based, carbonate-based, alkane, aromatic solvents and the like are preferred, and examples thereof include methyl ethyl ketone (MEK), dimethyl carbonate, methyl acetate, acetone, methylene chloride, cyclohexanone, and the like. These solvents may be used in mixture of a plurality thereof within the range not significantly deteriorating the dispersibility.

Figure 2:
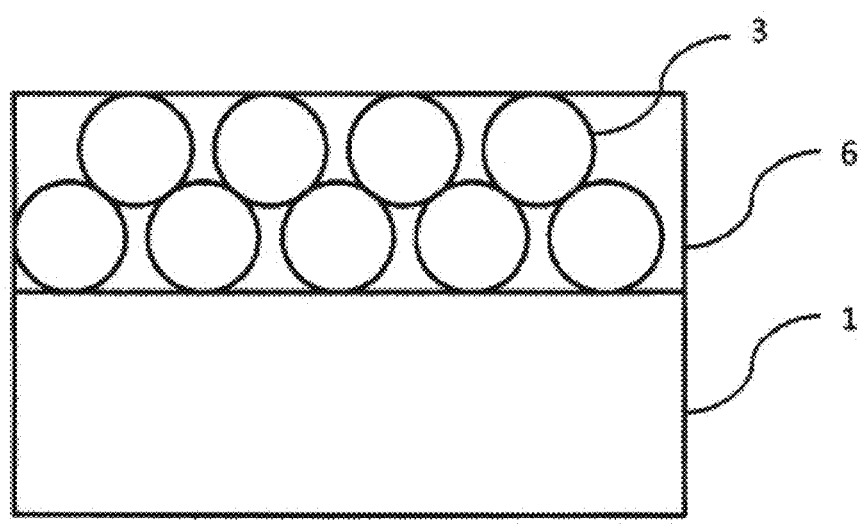
FIG. 2 is a cross-sectional schematic view for explaining a manufacturing method of an example of the antireflection article of the present invention.

FIG. 2 is a schematic view for explaining the method of manufacturing an antireflection article according to the present invention.

In the step of applying a antireflection layer-forming composition on a substrate and volatilizing the solvent, the surface of the uncured antireflection layer-forming composition 6 is located around the apexes of convex portions of the first particle group as illustrated in FIG. 2. And then, the binder (a) and the binder (b) are cured and shrunk by the step of heating and curing the binder (a) and the binder (b), and the surface of a binder resin 4 may be lowered to a desired position as illustrated in FIG. 1.

In the method of manufacturing an antireflection article according to the present invention, it is preferred that the haze is set to 1.5% or less at the time point when the residual solvent amount is set to 5% by mass, and the haze is set to 2% or less at the time point when the residual solvent amount is set to 0.5% by mass.

As described above, the B/A of the unevenness shape may be set to 0.55 or more by disposing particles having a 2-tier structure by the first particle group and the second particle group on the substrate and appropriately adjusting the relationship between the residual solvent amount and the haze.

Further, by the manufacturing method of the present invention, an antireflection layer having excellent binding force between the metal oxide particles and the binder resin may be conveniently manufactured even though a processing is not performed at high temperature in order to increase the binding force between the metal oxide particles and the binder resin.

Furthermore, an application composition for an antireflection layer may also include a dispersing agent of particles, a leveling agent, an antifouling agent, and the like.

The leveling agent may easily enable the particles or the binder resin to be uniformly arranged by lowering the surface tension of the application liquid to stabilize the solution after application. It is possible to use compounds described, for example, in Japanese Patent Laid-Open Publication Nos. 2004-331812 and 2004-163610, and the like.

The antifouling agent may suppress adhesion of stains or fingerprints by imparting water and oil repellency to the moth eye structure. It is possible to use compounds described, for example, in Japanese Patent Laid-Open Publication No. 2012-88699, and the like.

The method of applying the antireflection layer-forming composition is not particularly limited, and a publicly known method may be used. Examples thereof include a dip coat method, an air knife coat method, a curtain coat method, a roller coat method, a wire bar coat method, a gravure coat method, a die coat method, and the like.

From the viewpoint of being easily and uniformly applied, the concentration of solids in the antireflection layer-forming composition is preferably 5% by mass to 50% by mass, and more preferably 10% by mass to 40% by mass.

As a method of drying the solvent in the antireflection layer-forming composition, it is preferred that the solvent is dried in a temperature range of 18° C. to 80° C. in order to volatilize and dry the solvent. When the temperature at which the solvent is volatilized and dried is 18° C. or more, the volatilization velocity of the solvent becomes fast, and the volatilization drying time is shortened, so that the productivity is improved. When the temperature at which the solvent is volatilized and dried is 18° C. or less, the volatilization of the binder may be suppressed, so that the surface of the antireflection layer-forming composition is easily maintained around the apexes of the convex portions of the first particle group.

As a method of curing the binder (a) and the binder (b) of the antireflection layer-forming composition, a thermal curing using the above-described metal chelate catalyst is preferred, and it is preferred that the binders are cured in a temperature range of 100° C. to 190° C. When the temperature is 100° C. or more, the temperature difference between the volatilization and the drying is large, the solvent does not remain behind, and the strength of the antireflection layer after curing is improved. Further, when the temperature is 190° C. or less, in the case where a chemically reinforced glass is used as a substrate, the temperature is preferred because calcium ions are not extracted.

In addition, it is preferred to additionally use a photocuring using a photo-acid generator in combination with a thermal curing using the metal chelate catalyst. Furthermore, when a compound containing a (meth)acryloyl group is used as a compound represented by any one of Formulae (1) to (3), it is also preferred to use a photopolymerization initiator in combination.

[Cover Glass]

The antireflection article of the present invention or an antireflection article manufactured by the manufacturing method of the present invention has an antireflection function and high hardness, and thus may be used as a cover glass. A cover glass including the antireflection article of the present invention is disposed, for example, on a display surface of an image display device, and thus may be suitably used particularly for a smartphone, a tablet PC, a digital signage, and the like.

[Image Display Device]

The image display device of the present invention includes the antireflection article of the present invention.

The antireflection article of the present invention may be suitably used for an image display device such as a liquid crystal display (LCD), a plasma display panel (PDP), an electroluminescence display (ELD), or a cathode ray tube display device (CRT), and particularly, a liquid display device is preferred. As a cover glass of these image display devices, the antireflection article of the present invention may be used.

EXAMPLES

Hereinafter, the present invention will be described in more detail with reference to the Examples. The materials, reagents, amounts and ratios of substances, operations, and the like described in the following Examples may be appropriately changed as long as they do not depart from the spirit of the present invention. Therefore, the scope of the present invention is not limited to the following specific examples.

[Preparation of Silica Particles a-1]

67.54 kg of methyl alcohol and 26.33 kg of 28% by mass ammonia water (water and catalyst) were placed into a 200 L-capacity reactor equipped with a stirrer, a dropping device, and a thermometer, and the liquid temperature was adjusted to 33° C. under stirring. Meanwhile, a solution of 12.70 kg of tetramethoxysilane dissolved in 5.59 kg of methyl alcohol was prepared in the dropping device. The solution was added dropwise from the dropping device over 1 hour to the reactor while maintaining the liquid temperature at 33° C. in the reactor, and after the dropwise addition was completed, stirring was carried out for additionally 1 hour while maintaining the liquid temperature to the aforementioned temperature and the tetramethoxysilane was subjected to hydrolysis and condensation to obtain a dispersion containing a silica particle precursor. The dispersion was subjected to flash drying using an instantaneous vacuum evaporator (Clarks system CVX-8B type manufactured by Hosokawa Micron Corporation) under conditions of a heating pipe temperature of 175° C. and a reduced pressure of 200 torr (27 kPa) to obtain silica particles a-1. The average primary diameter of the obtained silica particles was 200 nm, the polydispersity of the particle diameters (CV value): 3.5%, the hydroxyl group content: $2.85 \times 10^{-1}$, and the indentation hardness was 330 MPa.

[Preparation of Calcined Silica Particles b-1]

Into a crucible, 5 kg of silica particles a-1 were placed, calcined using an electric furnace at 900° C. for 1 hour, cooled, and then pulverized using a pulverizer to obtain non-classified calcined silica particles. Further, crushing and classification were performed using a jet milling classifier (IDS-2 type manufactured by Nippon Pneumatic Mfg. Co., Ltd.) to obtain calcined silica particles b-1. The average primary diameter of the obtained silica particles was 180 nm, the polydispersity of the particle diameters (CV value): 3.7%, the hydroxyl group content: $9.60 \times 10^{-2}$, and the indentation hardness was 400 MPa.

[Preparation of Calcined Silica Particles b-2]

Into a crucible, 5 kg of silica particles a-1 were placed, calcined using an electric furnace at 1,050° C. for 1 hour, cooled, and then pulverized using a pulverizer to obtain non-classified calcined silica particles. Further, crushing and classification were performed using a jet milling classifier (IDS-2 type manufactured by Nippon Pneumatic Mfg. Co., Ltd.) to obtain calcined silica particles b-2. The average diameter of the obtained silica particles was 180 nm, the polydispersity of the particle diameters (CV value): 3.8%, the hydroxyl group content: $7.50 \times 10^{-3}$, and the indentation hardness was 500 MPa.

[Preparation of Calcined Silica Particles b-3]

Into a Crucible, 5 kg of Silica Particles a-1 were Placed, Calcined Using an Electric furnace at 1,050° C. for 2 hours, cooled, and then pulverized using a pulverizer to obtain non-classified calcined silica particles. Further, crushing and classification were performed using a jet milling classifier (IDS-2 type manufactured by Nippon Pneumatic Mfg. Co., Ltd.) to obtain calcined silica particles b-3. The average diameter of the obtained silica particles was 180 nm, the polydispersity of the particle diameters (CV value): 3.6%, the hydroxyl group content: $9.60 \times 10^{-4}$, and the indentation hardness was 600 MPa.

Meanwhile, the hydroxyl group content on the particle surface and the indentation hardness of the particles were measured by the following method.

[Measurement of Hydroxyl Group Content on Particle Surface]

The hydroxyl group content ($Q1 \times 3 + Q2 \times 2$) was calculated by measuring the signal intensities Q2 and Q1 using a solid-state $^{29}$Si NMR under the following conditions.

Measurement method: $^{29}$Si CP/MAS
Observation frequency: $^{29}$Si: 59.63 MHz
Spectral width: 22675.74 Hz
Number of times added up: 2,000 times
Contact time: 5 ms
900 Pulse: 4.8 µs
Measurement waiting time: 2 seconds
MAS rotation speed: 3 kHz
Chemical shift: −91 ppm to −94 ppm for Q2, −100 to −102 ppm for Q1

[Measurement of Indentation Hardness of Metal Oxide Particles]

Into 91 g of ethanol, 8 g of each of the metal oxide particles, 0.3 g of Irgacure184 (manufactured by BASF Japan Ltd.), and 7.7 g of KAYARAD PET30 (manufactured by Nippon Kayaku Co., Ltd.) were introduced, stirred for 10 minutes, and then, dispersed by an ultrasonic disperser for 10 minutes to obtain 15% by mass of a dispersion. The dispersion was applied on a glass plate in a wet applying amount of about 3 ml/m², and cured by irradiating ultraviolet rays at a dose of 600 mJ/cm² by an air-cooled metal halide lamp while purging with nitrogen such that an oxygen concentration became 0.1 vol % or less in the atmosphere. Thereafter, it was observed by SEM that the metal oxide particles were not stacked in one or more tiers. For this sample, the indentation hardness of the metal oxide particles was measured using a triboindenter (TI-950 manufactured by Hysitron, Inc.) under measurement conditions of a diamond indenter having a diameter of 1 μm and an indentation load of 0.05 mN.

(Preparation of Antireflection Layer-Forming Composition)

Each component shown in the following Table 1 was introduced into a mixing tank, stirred for 60 minutes, dispersed by an ultrasonic disperser for 30 minutes, and filtered with a polypropylene-made filter having a pore size of 5 μm to prepare compositions for forming an antireflection layer (application liquids). Meanwhile, Table 1 shows the amount of each component added as a solid content (parts by mass). Further, the mixing ratio (mass ratio) of the binder (a) and the binder (b) and the SP value after mixing were described.

(Manufacture of Antireflection Article)

On a substrate shown in the following Table 1, the antireflection layer-forming composition shown in the following Table 1 was applied using a gravure coater, such that the application amount became 3 ml/m². As a step of volatilizing and drying the solvent, the solvent was dried at 80° C. for 5 minutes, and then as a step of heating and curing the binder components, the binder components were heated at 150° C. for 2 hours to manufacture an antireflection article. By doing this, Antireflection Article Samples 1 to 23 and 101 to 107 were obtained.

TABLE 1

| | Substrate | Particle | Amount of particle added | Binder (a) | Binder (b) | Amount of binders added |
|---|---|---|---|---|---|---|
| Ex. Sample 1 | Chemically reinforced glass | Silica particle b-1 | 9.2 | Compound c | Sol Liquid a | 13.1 |
| Ex. Sample 2 | Chemically reinforced glass | Silica particle b-1 | 9.2 | X-40-2671G | Sol Liquid a | 13.1 |
| Ex. Sample 3 | Chemically reinforced glass | Silica particle b-2 | 9.2 | Compound c | Sol Liquid a | 13.1 |
| Ex. Sample 4 | Chemically reinforced glass | Silica particle b-3 | 9.2 | Compound c | Sol Liquid a | 13.1 |
| Ex. Sample 5 | Chemically reinforced glass | Silica particle b-3 | 9.2 | Compound c | Sol Liquid a | 13.1 |
| Ex. Sample 6 | Chemically reinforced glass | Silica particle b-1 | 9.2 | Ethyl Silicate 40 | Acid-treated Ethyl Silicate 40 | 13.1 |
| Ex. Sample 7 | Chemically reinforced glass | Silica particle b-1 | 9.2 | Ethyl Silicate 48 | Acid-treated Ethyl Silicate 48 | 13.1 |
| Ex. Sample 8 | Chemically reinforced glass | Silica particle b-1 | 9.2 | Ethyl Silicate 48 | Acid-treated Ethyl Silicate 48 | 13.1 |
| Ex. Sample 9 | Chemically reinforced glass | Silica particle b-1 | 9.2 | Ethyl Silicate 48 | Acid-treated Ethyl Silicate 40 | 13.1 |
| Ex. Sample 10 | Chemically reinforced glass | Silica particle b-2 | 9.2 | Ethyl Silicate 40 | Acid-treated Ethyl Silicate 40 | 13.1 |
| Ex. Sample 11 | Chemically reinforced glass | Silica particle b-3 | 9.2 | Ethyl Silicate 40 | Acid-treated Ethyl Silicate 40 | 13.1 |
| Ex. Sample 12 | Chemically reinforced glass | Silica particle b-3 | 9.2 | Ethyl Silicate 40 | Acid treated Ethyl Silicate 40 | 13.1 |
| Ex. Sample 13 | Chemically reinforced glass | Silica particle b-3 | 9.2 | ORGATICS TA-21 | Acid-treated Ethyl Silicate 40 | 13.1 |
| Ex. Sample 14 | Chemically reinforced glass | KE-S30 | 9.2 | Ethyl Silicate 40 | Acid-treated Ethyl Silicate 40 | 13.1 |
| Ex. Sample 15 | Sapphire glass | Silica particle b-1 | 9.2 | Ethyl Silicate 40 | Acid-treated Ethyl Silicate 40 | 13.1 |
| Ex. Sample 16 | Sapphire glass | Silica particle b-2 | 9.2 | Ethyl Silicate 40 | Acid-treated Ethyl Silicate 40 | 13.1 |
| Ex. Sample 17 | Sapphire glass | Silica particle b-3 | 9.2 | Ethyl Silicate 40 | Acid-treated Ethyl Silicate 40 | 13.1 |
| Ex. Sample 18 | Sapphire glass | Silica particle b-3 | 9.2 | Ethyl Silicate 40 | Acid-treated Ethyl Silicate 40 | 13.1 |
| Ex. Sample 19 | Sapphire glass | Silica particle b-3 | 9.2 | ORGATICS TA-21 | Acid-treated Ethyl Silicate 40 | 13.1 |
| Ex. Sample 20 | Sapphire glass | KE-S30 | 9.2 | Ethyl Silicate 40 | Acid-treated Ethyl Silicate 40 | 13.1 |
| Ex. Sample 21 | Sapphire glass | Silica particle b-2 | 9.2 | Compound c | Sol Liquid a | 13.1 |
| Ex. Sample 22 | Sapphire glass | Silica particle b-3 | 9.2 | Compound c | Sol Liquid a | 13.1 |
| Ex. Sample 23 | Sapphire glass | Silica particle b-3 | 9.2 | Compound c | Sol Liquid a | 13.1 |
| C. Ex. Sample 101 | Chemically reinforced glass | Silica particle b-1 | 9.2 | Ethyl Silicate 40 | Acid-treated Ethyl Silicate 40 | 13.1 |
| C. Ex. Sample 102 | Chemically reinforced glass | Silica particle b-1 | 9.2 | Ethyl Silicate 48 | Ethyl Silicate 40 | 13.1 |
| C. Ex. Sample 103 | Chemically reinforced glass | Silica particle b-1 | 9.2 | Ethyl Silicate 48 | — | 13.1 |
| C. Ex. Sample 104 | Chemically reinforced glass | Silica particle b-1 | 9.2 | — | Acid-treated Ethyl Silicate 40 | 13.1 |
| C. Ex. Sample 105 | Chemically reinforced glass | Silica particle b-1 | 9.2 | Ethyl Silicate 28 | Acid-treated Ethyl Silicate 40 | 13.1 |
| C. Ex. Sample 106 | Chemically reinforced glass | Silica particle b-1 | 9.2 | Ethyl Silicate 40 | Acid-treated Ethyl Silicate 40 | 13.1 |
| C. Ex. Sample 107 | Chemically reinforced glass | Silica particle b-1 | 9.2 | Ethyl Silicate 40 | Acid-treated Ethyl Silicate 40 | 13.1 |

| | Blending ratio (SP value) | Catalyst | Amount of catalyst added | Others | Amount of others added | Blending ratio of fine particle/binder |
|---|---|---|---|---|---|---|
| Ex. Sample 1 | a/b = 5/5 (21.9) | Tris(2,4-pentanedionato)Al (III) | 0.3 | Ethanol | 77.4 | 41/59 |
| Ex. Sample 2 | a/b = 5/5 (21.7) | Tris(2,4-pentanedionato)Al (III) | 0.3 | Ethanol | 77.4 | 41/59 |
| Ex. Sample 3 | a/b = 5/5 (21.9) | Tris(2,4-pentanedionato)Al (III) | 0.3 | Ethanol | 77.4 | 41/59 |
| Ex. Sample 4 | a/b = 5/5 (21.9) | Tris(2,4-pentanedionato)Al (III) | 0.3 | Ethanol | 77.4 | 41/59 |
| Ex. Sample 5 | a/b = 5/5 (21.9) | D-25 | 0.3 | Ethanol | 77.4 | 41/59 |
| Ex. Sample 6 | a/b = 8/2 (21.7) | Tris(2,4-pentanedionato)Al (III) | 0.3 | Ethanol | 77.4 | 41/59 |
| Ex. Sample 7 | a/b = 8/2 (21.8) | Tris(2,4-pentanedionato)Al (III) | 0.3 | Ethanol | 77.4 | 41/59 |
| Ex. Sample 8 | a/b = 8/2 (21.7) | Tris(2,4-pentanedionato)Al (III) | 0.3 | Ethanol | 77.4 | 41/59 |
| Ex. Sample 9 | a/b = 8/2 (21.8) | Tris(2,4-pentanedionato)Al (III) | 0.3 | Ethanol | 77.4 | 41/59 |
| Ex. Sample 10 | a/b = 8/2 (21.7) | Tris(2,4-pentanedionato)Al (III) | 0.3 | Ethanol | 77.4 | 41/59 |
| Ex. Sample 11 | a/b = 8/2 (21.7) | Tris(2,4-pentanedionato)Al (III) | 0.3 | Ethanol | 77.4 | 41/59 |
| Ex. Sample 12 | a/b = 8/2 (21.7) | D-25 | 0.3 | Ethanol | 77.4 | 41/59 |
| Ex. Sample 13 | a/b = 8/2 (21.3) | Tris(2,4-pentanedionato)Al (III) | 0.3 | Ethanol | 77.4 | 41/59 |
| Ex. Sample 14 | a/b = 8/2 (21.7) | Tris(2,4-pentanedionato)Al (III) | 0.3 | Ethanol | 77.4 | 41/59 |
| Ex. Sample 15 | a/b = 8/2 (21.7) | Tris(2,4-pentanedionato)Al (III) | 0.3 | Ethanol | 77.4 | 41/59 |
| Ex. Sample 16 | a/b = 8/2 (21.7) | Tris(2,4-pentanedionato)Al (III) | 0.3 | Ethanol | 77.4 | 41/59 |

TABLE 1-continued

| | | | | | | |
|---|---|---|---|---|---|---|
| Ex. Sample 17 | a/b = 8/2 (21.7) | Tris(2,4-pentanedionato)Al (III) | 0.3 | Ethanol | 77.4 | 41/59 |
| Ex. Sample 18 | a/b = 8/2 (21.7) | D-25 | 0.3 | Ethanol | 77.4 | 41/59 |
| Ex. Sample 19 | a/b = 8/2 (21.3) | Tris(2,4-pentanedionato)Al (III) | 0.3 | Ethanol | 77.4 | 41/59 |
| Ex. Sample 20 | a/b = 8/2 (21.7) | Tris(2,4-pentanedionato)Al (III) | 0.3 | Ethanol | 77.4 | 41/59 |
| Ex. Sample 21 | a/b = 5/5 (21.9) | Tris(2,4-pentanedionato)Al (III) | 0.3 | Ethanol | 77.4 | 41/59 |
| Ex. Sample 22 | a/b = 5/5 (21.9) | Tris(2,4-pentanedionato)Al (III) | 0.3 | Ethanol | 77.4 | 41/59 |
| Ex. Sample 23 | a/b = 5/5 (21.9) | D-25 | 0.3 | Ethanol | 77.4 | 41/59 |
| C. Ex. Sample 101 | a/b = 8/2 (21.7) | Tris(2,4-pentanedionato)Al (III) | 0.3 | Ethanol | 77.4 | 41/59 |
| C. Ex. Sample 102 | a/b = 5/5 (17.0) | Tris(2,4-pentanedionato)Al (III) | 0.3 | Ethanol | 77.4 | 41/59 |
| C. Ex. Sample 103 | (17) | Tris(2,4-pentanedionato)Al (III) | 0.3 | Ethanol | 77.4 | 41/59 |
| C. Ex. Sample 104 | (41.1) | Tris(2,4-pentanedionato)Al (III) | 0.3 | Ethanol | 77.4 | 41/59 |
| C. Ex. Sample 105 | a/b = 7.5/2.5 (21.7) | Tris(2,4-pentanedionato)Al (III) | 0.3 | Ethanol | 77.4 | 41/59 |
| C. Ex. Sample 106 | a/b = 8/2 (21.7) | Nitric acid | 0.3 | Ethanol | 77.4 | 41/59 |
| C. Ex. Sample 107 | a/b = 8/2 (21.7) | Tris(2,4-pentanedionato)Al (III) | 0.3 | Ethanol | 81.1 | 30/70 |

The amount is an amount of each component added as a solid content (parts by mass).
a/b is a blending ratio of the binder (a) and the binder (b) (mass ratio).

Each of the compounds used will be described below.
(Substrate)

A chemically reinforced glass substrate (substrate including both an Al—O bond and a Si—O bond): a chemically reinforced glass manufactured by Matsunami Glass Ind., Ltd., a thickness 0.7 mm, a compressive stress of the surface 650 MPa, and thickness of the chemically reinforced layer 40 μm A sapphire glass (substrate composed only of an Al—O bond): a sapphire single crystal substrate manufactured by SHINKOSHA CO., LTD., a thickness 0.7 mm, a compressive stress of the surface 3,000 MPa, and no chemically reinforced layer.

(Metal Oxide Particles)

KE-S30: SEAHOSTAR KE-S30, silica particles having an average primary particle diameter of 300 nm (manufactured by NIPPON SHOKUBAI CO., LTD., the polydispersity of the particle diameters (CV value): 3.0%, the hydroxyl group content: $4.4 \times 10^{-3}$, and the indentation hardness 530 MPa)

<Binder (a), Binder (b)>
[Compound C]

To a flask equipped with a reflux condenser and a thermometer, 19.3 g of KBE-9007 manufactured by Shin-Etsu Chemical Co., Ltd., 3.9 g of glycerin 1,3-bisacrylate, 6.8 g of hydroxyethyl acrylate, 6.8 g of 2-hydroxyethyl acrylate, 0.1 g of dibutyltin dilaurate, and 70.0 g of toluene were added, and stirred at room temperature for 12 hours. After the stirring, 500 ppm of methylhydroquinone was added thereto, and distillation was performed under reduced pressure to obtain Compound C.

Compound C

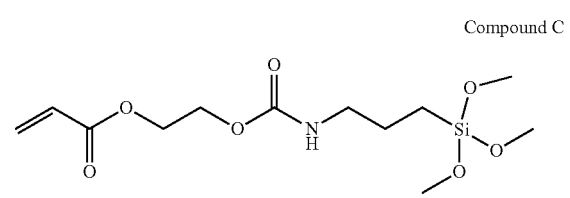 [SMILES: C=CC(=O)OCCOC(=O)NCCC[Si](OC)(OC)OC]

X-40-2671G: manufactured by Shin-Etsu Chemical Co., Ltd.

X-40-2671G is a compound in Formula (2) described in Japanese Patent Laid-Open Publication No. 2007-41495, in which $R^1$ is a hydrogen atom, Y is *—COO—**, L is a linking group having 3 carbon atoms ($C_3H_6$), $R^2$, $R^3$, and $R^4$ are a methoxy group, and the weight average molecular weight is 1,500 and the SP value is 19.3.

Ethyl Silicate 28: tetraethoxysilane (manufactured by COLCOAT CO., Ltd., molecular weight 208, and SP value 16.1)

Ethyl Silicate 40: tetraethoxysilane pentamer (manufactured by COLCOAT CO., Ltd., weight average molecular weight 526, and SP value 16.9)

Ethyl Silicate 48: tetraethoxysilane decamer (manufactured by COLCOAT CO., Ltd., weight average molecular weight 964, and SP value 17.0)

ORGATICS TA-21: tetra-normal butyl titanate (manufactured by Matsumoto Fine Chemical Co. Ltd., molecular weight 340, and SP value 17.6)

<Acid-Treated Ethyl Silicate>

To a reactor equipped with a stirrer, 120 parts by mass of methyl ethyl ketone, 100 parts by mass of Ethyl Silicate 40, 2 parts by mass of hydrochloric acid, and 2 parts by mass of ion exchange water were added, reacted at 60° C. for 1 hour, and then cooled to room temperature to obtain acid-treated Ethyl Silicate 40. The weight average molecular weight and the SP value were 324 and 41.1, respectively.

Further, acid-treated Ethyl Silicate 48 was obtained by performing the same treatment as described above, except that 4 parts by mass of ion exchange water were added thereto using Ethyl Silicate 48 instead of Ethyl Silicate 40. The weight average molecular weight and the SP value were 629 and 41.1, respectively.

The acid-treated Ethyl Silicate 40 is a compound in the following structural formula in which m=5, and the acid-treated Ethyl Silicate 48 is a compound in the following structural formula in which m=10.

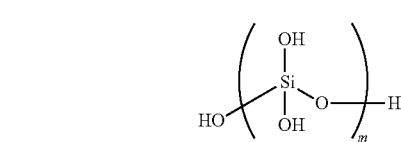

1<Preparation of Sol Liquid a>

To a reactor equipped with a stirrer and a reflux condenser, 120 parts by mass of methyl ethyl ketone, 100 parts by mass of acryloyloxypropylmethoxysilane (KBM-5103, manufactured by Shin-Etsu Chemical Co., Ltd.), and 3 parts by mass of diisopropoxyaluminumethylacetoacetate were added, mixed, and then 30 parts by mass of ion exchange water was added thereto to react the mixture at 60° C. for 4 hours, and then the mixture was cooled to room temperature to obtain Sol Liquid a having a solid content of 28% by mass. The weight average molecular weight was 1,800, and the components having a molecular weight of 1,000 to 20,000 among the components of oligomer components or more were 100%. Further, in the gas chromatography analysis, the raw material acryloyloxypropyltrimethoxysilane does not remain behind at all. The SP value calculated from the structural formula was 24.1.

<Catalyst>

Tris(2,4-pentanedionato)aluminum (III): Al chelate complex (manufactured by Tokyo Chemical Industry Co., Ltd.)

D-25: Ti chelate complex (Shin-Etsu Chemical Co., Ltd.)

Nitric acid: Special grade, manufactured by Wako Pure Chemical Industries, Ltd.

(Evaluation of Antireflection Articles)

Various characteristics of the antireflection article were evaluated by the following methods. The results are shown in Table 2 and Table 3.

<Integrated Reflectance>

In a state where the rear surface (substrate side) of the antireflection article was treated with black ink to remove the rear surface reflection, a spectrophotometer V-550 (manufactured by JASCO CORPORATION) was provided with an adapter ARV-474 to measure an integrated reflectance at an incident angle of 5° in a wavelength region of 380 nm to 780 nm, and the average reflectance was calculated to evaluate antireflection properties.

<Moth Eye Unevenness, Number of Steps of Particles, Interparticle Void>

The antireflection article was gashed by a diamond cutter, and then the cash was cut through to expose the cross-section, carbon was deposited on the cross-section, and then an etching treatment was performed for 10 minutes. 20 visual fields were observed and captured at 5,000-fold magnification using a scanning electron microscope (SEM). In the obtained image, a distance A between apexes of adjacent convex portions at an interface formed by the air and the sample, and a distance B between a center of the adjacent convex portions and a concave portion were measured at 100 points, and calculated as an average value of B/A.

Further, based on an image of 5 visual fields randomly extracted in the obtained image, it was observed whether the number of steps of particles in the film thickness direction (the number of particles in a direction orthogonal to the substrate surface) and interparticle voids (interparticle void in the present specification refers to a region which is spatially limited by a 3-dimensional placement of particles, and thus does not allow particle and binder to be present therein) were present.

<Pencil Hardness Test>

A pencil hardness evaluation described in JIS K 5600-5-4 (1999) was performed, and then, the pencil marks were removed by an eraser. After each sample was moisture-conditioned at a temperature of 25° C. and a humidity of 60% RH for 3 hours, the sample was evaluated in accordance with the following criteria by using a test pencil defined in JIS S6006 (2007). For a sample having a mark seen after the test, the test mark was observed by SEM to observe whether the particles were dropped and crushed.

A: No dropping of particles nor crushing of particles was observed after a 6H test.

B: No dropping of particles nor crushing of particles was observed after a 5H test.

C: No dropping of particles nor crushing of particles was observed after a 4H test.

D: Dropping of particles or crushing of particles was observed after a 4H test.

<Haze>

The uniformity of the surface was evaluated as a haze value. A non-uniform surface where particles were aggregated had a high haze. In accordance with JIS-K7136, the total haze value (%) of the obtained antireflection article was measured. In the measuring device, a haze meter NDH4000 manufactured by Nippon Denshoku Industries Co., Ltd. was used.

Haze value of 2% or less • • • No cloudiness feeling is present, and the uniformity of the surface is excellent.

Haze value of 4% or less • • • Slight cloudiness feeling is present, but there is no problem in appearance.

Haze value of more than 4% • • • Cloudiness feeling is strong, and the appearance is damaged.

Further, in the process of manufacturing the antireflection article, a haze at the time point when the residual solvent amount of the antireflection layer was set to 5% by mass ("residual solvent 5% haze") was also measured, and the results are shown in Table 2.

<Antifouling Property>

For the antireflection article having a moth eye structure according to the present invention, fingerprints were adhered to the surface of the antireflection layer under the conditions of 25° C. and 60 RH % to allow the fingerprint stain to be clearly seen when observed from the front by the unaided eye. The antireflection layer side was irradiated by Xenon Weather meter NX75 (manufactured by Suga Test Instruments Co., Ltd., irradiance 100 W/m$^2$, in-tank temperature 35° C., BP temperature 63° C., and humidity 50% RH conditions) for 1 hour, and then the antireflection article was wiped off at two reciprocations by Savina (manufactured by KB SEIREN, LTD., void 1 μm) bound with 10 sheets thereof overlapped under a load sufficient to dent the bundles of cloth to evaluate the antifouling property with an observation situation of the fingerprint stain.

A: Fingerprint stain may not be observed from the front surface, nor be observed obliquely.

B: Fingerprint stain may be observed from the front surface, but may not be observed obliquely.

C: Fingerprint stain may be observed even from the front surface.

TABLE 2

| | Evaluation Result | | | | | | |
|---|---|---|---|---|---|---|---|
| | Integrated reflectance | Moth eye unevenness | Number of steps of particles | Interparticle void | Pencil hardness | Residual solvent 5% Haze | Haze |
| Ex. Sample 1 | 0.77% | B/A = 0.65 | 2 | None | C | 0.9% | 1.6% |
| Ex. Sample 2 | 0.85% | B/A = 0.58 | 2 | None | C | 1.1% | 1.8% |
| Ex. Sample 3 | 0.77% | B/A = 0.65 | 2 | None | B | 0.9% | 1.6% |
| Ex. Sample 4 | 0.77% | B/A = 0.65 | 2 | None | A | 0.9% | 1.6% |
| Ex. Sample 5 | 0.77% | B/A = 0.65 | 2 | None | A | 0.9% | 1.6% |
| Ex. Sample 6 | 0.82% | B/A = 0.60 | 2 | None | C | 1.1% | 1.8% |
| Ex. Sample 7 | 0.97% | B/A = 0.55 | 2 | None | C | 1.0% | 1.7% |

TABLE 2-continued

| | Evaluation Result | | | | | | |
|---|---|---|---|---|---|---|---|
| | Integrated reflectance | Moth eye unevenness | Number of steps of particles | Interparticle void | Pencil hardness | Residual solvent 5% Haze | Haze |
| Ex. Sample 8 | 0.88% | B/A = 0.59 | 2 | None | C | 1.1% | 1.8% |
| Ex. Sample 9 | 0.92% | B/A = 0.56 | 2 | None | C | 1.1% | 1.8% |
| Ex. Sample 10 | 0.82% | B/A = 0.60 | 2 | None | B | 1.1% | 1.8% |
| Ex. Sample 11 | 0.82% | B/A = 0.60 | 2 | None | A | 1.1% | 1.8% |
| Ex. Sample 12 | 0.82% | B/A = 0.60 | 2 | None | A | 1.1% | 1.8% |
| Ex. Sample 13 | 0.77% | B/A = 0.65 | 2 | None | A | 1.1% | 1.8% |
| Ex. Sample 14 | 0.82% | B/A = 0.60 | 2 | None | B | 1.3% | 2.0% |
| Ex. Sample 15 | 0.82% | B/A = 0.60 | 2 | None | C | 1.1% | 1.8% |
| Ex. Sample 16 | 0.82% | B/A = 0.60 | 2 | None | B | 1.1% | 1.8% |
| Ex. Sample 17 | 0.82% | B/A = 0.60 | 2 | None | A | 1.1% | 1.8% |
| Ex. Sample 18 | 0.82% | B/A = 0.60 | 2 | None | A | 1.1% | 1.8% |
| Ex. Sample 19 | 0.77% | B/A = 0.65 | 2 | None | A | 1.1% | 1.8% |
| Ex. Sample 20 | 0.82% | B/A = 0.60 | 2 | None | B | 1.3% | 2.0% |
| Ex. Sample 21 | 0.77% | B/A = 0.65 | 2 | None | B | 0.9% | 1.6% |
| Ex. Sample 22 | 0.77% | B/A = 0.65 | 2 | None | A | 0.9% | 1.6% |
| Ex. Sample 23 | 0.77% | B/A = 0.65 | 2 | None | A | 0.9% | 1.6% |
| C. Ex. Sample 101 | 0.82% | B/A = 0.60 | 2 | None | D | 1.1% | 1.8% |
| C. Ex. Sample 102 | 1.30% | B/A = 0.50 | 2 | None | C | 2.0% | 2.5% |
| C. Ex. Sample 103 | 1.30% | B/A = 0.50 | 2 | None | C | 2.0% | 2.5% |
| C. Ex. Sample 104 | 3.20% | B/A = 0.50 | 2 | None | C | 3.0% | 4.0% |
| C. Ex. Sample 105 | 1.40% | B/A = 0.50 | 2 | None | C | 1.1% | 2.5 |
| C. Ex. Sample 106 | 3.80% | B/A = 0.50 | 2 | None | D | 3.3% | 4.3 |
| C. Ex. Sample 107 | 1.30% | B/A = 0.50 | 1 | None | C | 1.1% | 2.2% |

TABLE 3

| | Evaluation Result Antifouling property |
|---|---|
| Ex. Sample 4 | B |
| Ex. Sample 11 | C |
| Ex. Sample 13 | A |
| Ex. Sample 17 | C |
| Ex. Sample 19 | A |

Example Samples 1 to 23 are excellent because the integrated reflectance is low, the pencil hardness is high, and the haze is low. Further, in Example Samples 13 and 19, compounds containing titanium as a compound for forming a binder resin are used, and the antifouling property in outdoor use is also excellent.

Comparative Example Sample 101 has a pencil hardness lower than those of the Examples because the indentation hardness of particles is low.

Comparative Example Samples 102 to 107 had higher reflectances than those in the Examples because the B/A in the unevenness having a moth eye structure is less than 0.55.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and there equivalents.

What is claimed is:

1. A method of manufacturing an antireflection article including:
   a substrate with a compressive stress of 500 MPa or more, consisting of an Al—O bond, or a substrate with a compressive stress of 500 MPa or more, containing both an Al—O bond and a Si—O bond, and
   an antireflection layer having a moth eye structure in an unevenness shape formed by metal oxide particles on a surface of the antireflection layer, on the substrate, wherein the metal oxide particles include a first particle group and a second particle group,
the method comprising:
applying, on the substrate, an antireflection layer-forming composition containing:
  (a) a binder having a weight average molecular weight of 300 to 2,000, which is at least one selected from a monomer represented by Formula (1), a monomer represented by Formula (2), and a product obtained by a condensation reaction of at least one of the monomer represented by Formula (1) and the monomer represented by Formula (2),
  (b) a binder having a weight average molecular weight of 2,000 or less, which is represented by Formula (3),
  metal oxide particles,
  a metal chelate catalyst, and
  a solvent
to dispose the first particle group which forms a convex portion having an unevenness shape and the second particle group between the first particle group and the substrate;
volatilizing and drying the solvent; and
heating and curing the binder (a) and the binder (b) after the volatilizing and drying of the solvent,
wherein the unevenness shape of the antireflection layer has a ratio B/A of 0.55 or more, which is a ratio of a distance B between a center of apexes of adjacent convex portions and a concave portion to a distance A between the apexes of the adjacent convex portions,
an average primary particle diameter of the metal oxide particles is 150 nm to 380 nm,
a hydroxyl group content on a surface of the metal oxide particles is $1.00 \times 10^{-1}$ or less,
an indentation hardness of the metal oxide particles is 400 MPa or more, and the binder (a) and the binder (b) are blended in the antireflection layer-forming composition at a blending ratio in which a solubility parameter (SP value) after mixing the binder (a) and the binder (b) is 20 to 24:

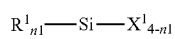

Formula (1)

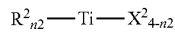

Formula (2)

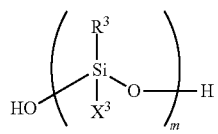

Formula (3)

wherein $R^1$, $R^2$ and $R^3$ each independently represent an alkyl group having 1 to 10 carbon atoms or a hydroxyl group, and optionally further includes a substituent, $X^1$, $X^2$ and $X^3$ each independently represent a hydrolysable group or a hydroxyl group, n1 and n2 each independently represent an integer of 0 to 1, m, in Formula (3), represents an integer of 1 to 22, and a plurality of $X^1$'s and a plurality of $X^2$'s are optionally same or different, and when a plurality of $X^3$, $R^1$, $R^2$ and $R^3$ is present, a plurality of $X^3$'s, a plurality of $R^1$'s and a plurality of $R^3$'s are optionally same or different.

2. The method of claim 1,
wherein the substrate containing both an Al—O bond and a Si—O bond comprises a chemically reinforced layer,
a thickness of the substrate is 1.8 mm or less, and
a thickness of the chemically reinforced layer is 300 μm or less.

3. The method of claim 1,
wherein a thickness of the substrate comprising only an Al—O bond is 1.8 mm or less.

4. The method of claim 1,
wherein the metal oxide particles are calcined silica particles.

5. The method of claim 1,
wherein a hydroxyl group content on the surface of the metal oxide particles is $1.0 \times 10^{-2}$ or less.

6. The method of claim 1,
wherein the metal chelate catalyst is a metal complex composed of a metal element selected from Group 2, Group 4, Group 5, and Group 13 of the periodic table, and an oxo- or hydroxyl oxygen-containing compound selected from β-dikentone, ketoester, hydroxycarboxylic acid or esters of the hydroxycarboxylic acid, aminoalcohol, and an enolic active hydrogen compound.

7. The method of claim 1,
wherein a haze is 1.5% or less at a time point when a residual solvent amount is set to 5% by mass, and the haze is 2% or less at a time point when the residual solvent amount is set to 0.5% by mass.

8. An antireflection article comprising:
a substrate with a compressive stress of 500 MPa or more, consisting of an Al—O bond or a substrate with a compressive stress of 500 MPa or more, containing both an Al—O bond and a Si—O bond, and
an antireflection layer containing a binder resin, metal oxide particles, and a metal chelate catalyst, the antireflection layer provided on the substrate and having a moth eye structure in an unevenness shape on a surface of the antireflection layer, wherein the metal oxide particles include a first particle group which forms a convex portion having an unevenness shape and a second particle group between the first particle group and the substrate, the unevenness shape of the antireflection layer has a ratio B/A of 0.55 or more, which is a ratio of a distance B between a center of apexes of adjacent convex portions and a concave portion to a distance A between the apexes of the adjacent convex portions, an average primary particle diameter of the metal oxide particles is 150 nm to 380 nm, a hydroxyl group content on the surface of the metal oxide particles is $1.00 \times 10^{-1}$ or less, an indentation hardness of the metal oxide particles is 400 MPa or more, and the binder resin contains:
a cured product of (a) a binder having a weight average molecular weight 300 to 2,000, which is at least one selected from a monomer represented by Formula (1), a monomer represented by Formula (2), and a product obtained by a condensation reaction of at least one of the monomer represented by Formula (1) and the monomer represented by Formula (2), and
a cured product of (b) a binder having a weight average molecular weight of 2,000 or less, which is represented by Formula (3), and
a solubility parameter (SP value) after mixing the binder (a) and the binder (b) is 20 to 24:

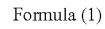

Formula (1)

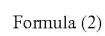

Formula (2)

Formula (3)

wherein $R^1$, $R^2$ and $R^3$ each independently represent an alkyl group having 1 to 10 carbon atoms or a hydroxyl group, and optionally further includes a substituent, $X^1$, $X^2$ and $X^3$ each independently represent a hydrolysable group or a hydroxyl group, n1 and n2 each independently represent an integer of 0 to 1, m, in Formula (3), represents an integer of 1 to 22, and a plurality of $X^1$'s and a plurality of $X^2$'s are optionally same or different, and when a plurality of $X^3$, $R^1$, $R^2$ and $R^3$ is present, a plurality of $X^3$'s, a plurality of $R^1$'s and a plurality of $R^3$'s are optionally same or different.

9. The antireflection article of claim 8,
wherein the number of particles contained in the first particle group in a direction orthogonal to the surface of the substrate is one,
the number of particles contained in the second particle group in a direction orthogonal to the surface of the substrate is one, and
a mass ratio of the metal oxide particles to the binder resin is 35/65 to 50/50.

10. The antireflection article of claim 8, wherein a binder resin is present between metal oxide particles constituting the second particle group and between the first particle group and the second particle group.

11. A cover glass comprising an antireflection article manufactured by the method of manufacturing an antireflection article of claim 1.

12. A cover glass comprising the antireflection article of claim 8.

13. An image display device comprising an antireflection article manufactured by the method of manufacturing an antireflection article of claim 1.

14. An image display device comprising the antireflection article of claim 8.

* * * * *